United States Patent [19]

Katz

[11] 4,199,876
[45] Apr. 29, 1980

[54] DEVICE FOR DISPLAYING AN IMPROVED PERIODIC TABLE OF THE ELEMENTS

[76] Inventor: Gerson Katz, R.D. 1, Millville, N.J. 08332

[21] Appl. No.: 942,111

[22] Filed: Sep. 13, 1978

[51] Int. Cl.$^2$ ............................................ G09B 23/24
[52] U.S. Cl. .................................................. 35/18 R
[58] Field of Search ............................... 35/18 R, 18 A

[56] References Cited

U.S. PATENT DOCUMENTS

| | | | |
|---|---|---|---|
| 3,581,409 | 6/1971 | Alexander | 35/18 R |
| 3,724,098 | 4/1973 | McSmith | 35/18 R |

FOREIGN PATENT DOCUMENTS

| | | | |
|---|---|---|---|
| Ad.55975 | 6/1952 | France | 35/18 A |
| 1239535 | 7/1971 | United Kingdom | 35/18 R |

*Primary Examiner*—Harland S. Skogquist
*Attorney, Agent, or Firm*—Charles E. Baxley

[57] ABSTRACT

A device for displaying a new and improved periodic table of the chemical elements is comprised of four detachable, coaxially mounted cylinders. Each cylinder is divided into an upper cylindrical section and a lower cylindrical section. The sections are also detachably mounted. The upper surfaces of each of the cylindrical sections are marked with discrete sectors containing indicia that denote the chemical elements. The device can also be used to determine n and l numbers of quantum theory for selected elements. An aid that has a transverse surface marked to correspond to the discrete sectors on the upper surfaces of the cylindrical sections is used to determine $m_l$ and $m_s$ numbers of quantum theory for selected elements.

A second device for displaying the new and improved periodic table of the elements is in the form of four detachable, concentrically mounted spheres. The surface of each of the spheres is divided into an upper hemisphere and a lower hemisphere. The hemispheres are preferably detachably mounted. The outer surface of each of the hemispheres is marked with discrete sectors containing indicia that denote the chemical elements.

15 Claims, 18 Drawing Figures

FIG. 1

DEVICE FOR DISPLAYING AN IMPROVED PERIODIC TABLE OF THE ELEMENTS

BACKGROUND OF THE INVENTION

It is generally accepted in physics and chemistry that the universe is made up of a number of stable and less stable elements ranging in progressive units of atomic weights of 1 (hydrogen) through 105 (hahnium). The periodic law states that the properties of the chemical elements and their compounds are a periodic function of their atomic number. The periodic table is a table of the elements written in sequence in the order of atomic number or atomic weight and arranged in horizontal rows (periods) and vertical columns (groups) to illustrate the occurrence of similarities in the properties of the elements as a periodic function of the sequence. Present versions of the table used in texts have remained essentially unchanged for the past fifty years, except for the addition of new elements.

The present periodic table has come to be universally accepted in its current form, although the format is unsatisfactory for a number of reasons. The chief shortcomings of the accepted version of the table are lack of a regular methematical plan throughout and ambiguity in locating the lanthanide and actinide series of elements and showing their true relationships to the other elements.

By making four changes in the present table, a new periodic table is created that eliminates these shortcomings. This improved table serves as the basis for two three-dimensional projections of the new table, each of which displays the properties of matter in a more coherent manner than before. The new table, and its projections, has as its foundation the contemporary concept of the electronic structure of atoms and contains within its form the rules of quantum physics. Yet this new table has been achieved for the most part without sacrificing the empirical relationships upon which the concept of the periodic law is based.

In addition, one of the three-dimensional models can be used to determine the four quantum numbers, n, l, m$_l$ and m$_s$.

SUMMARY OF THE INVENTION

It is a primary object of the present invention to provide a device that displays in three dimensions a new periodic table.

It is a further object of the present invention to provide a single device that can be used to determine the first two quantum numbers, n and l, of quantum theory for the terminal election of any given chemical element by using its position on the device.

It is a further object of the present invention to provide a quantum-number-finder aid, which is used in conjunction with a three-dimensional device that displays the new periodic table, to determine the third and fourth quantum numbers of the terminal electron.

It is a further object of the present invention to provide a Cylinder Model in the form of concentrically mounted cylinders that displays in a harmonic and orderly fashion the position of the chemical elements according to a new periodic table.

It is a further object of the present invention to provide a Sphere Model in the form of concentrically mounted spheres that displays in a harmonic and orderly fashion the position of the chemical elements according to a new periodic table.

DESCRIPTION OF THE DRAWINGS

The invention is illustrated by way of example in the accompanying drawings, which form part of this application and in which:

FIG. 1 illustrates the new periodic table.

DETAILED DESCRIPTION OF THE INVENTION

Figure 1:
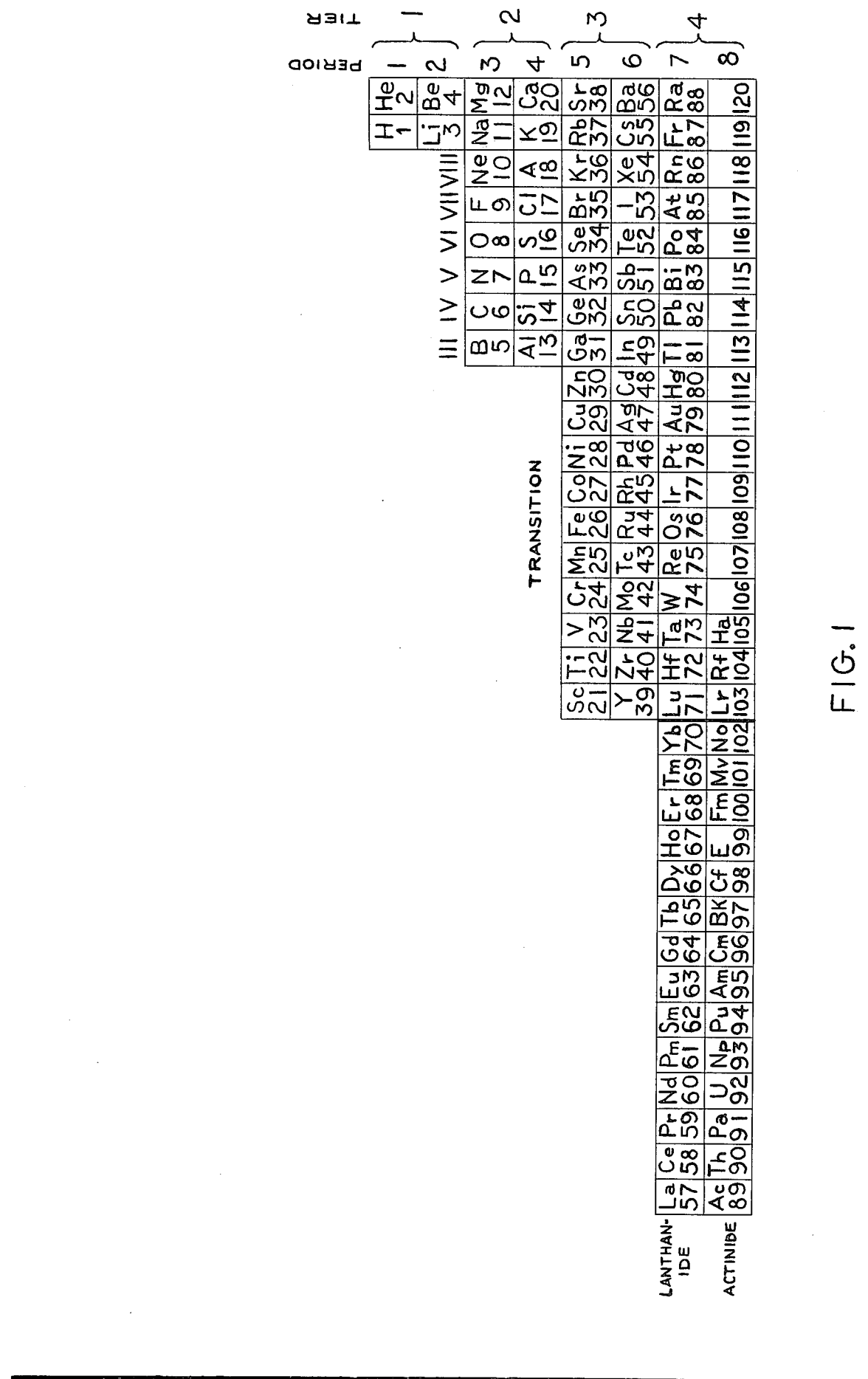

FIG. 1 shows the new and improved periodic table. This table results from making four basic changes in the most commonly accepted periodic table. The first change involves removing helium from the top of Group VIII elements and placing it at the top of the Group II column. The second change is to move Groups I and II as a unit from the left side of the table to the far right. The third change is to slide Groups I and II up one period. The fourth change is to place lutetium under yttrium and lawrencium under lutetium. The lanthanides and actinides are then placed to the left.

As shown in FIG. 1, this revised periodic table is regular in form, comprising eight periods rather than the previous seven. As indicated in FIG. 1, Period 1 starts at the top, and the periods continue in order down to Period 8 at the bottom. The periods are arranged in pairs, forming a stepped profile. The steps, which are indicated as tiers (T) of two periods each in FIG. 1, are four in number, with the top tier labeled Tier 1, the next down Tier 2, the next down Tier 3, and the bottom Tier 4.

It will be noted that the number of elements in each period ($N_p$) is a function of the tier number of that period as follows:

$$N_p = 2T^2.$$

Each of the two periods comprising each tier has the same number of elements, so that the number of elements in a tier ($N_t$) is as follows:

$$N_t = 2N_p.$$

All the named elements, ending with hahnium, are accommodated within the first four tiers, with space in the eighth period for an additional 15 elements with assigned atomic, or chemical, numbers from 106 through 120, indicating possible undiscovered elements of high atomic number.

Figures 2, 3:
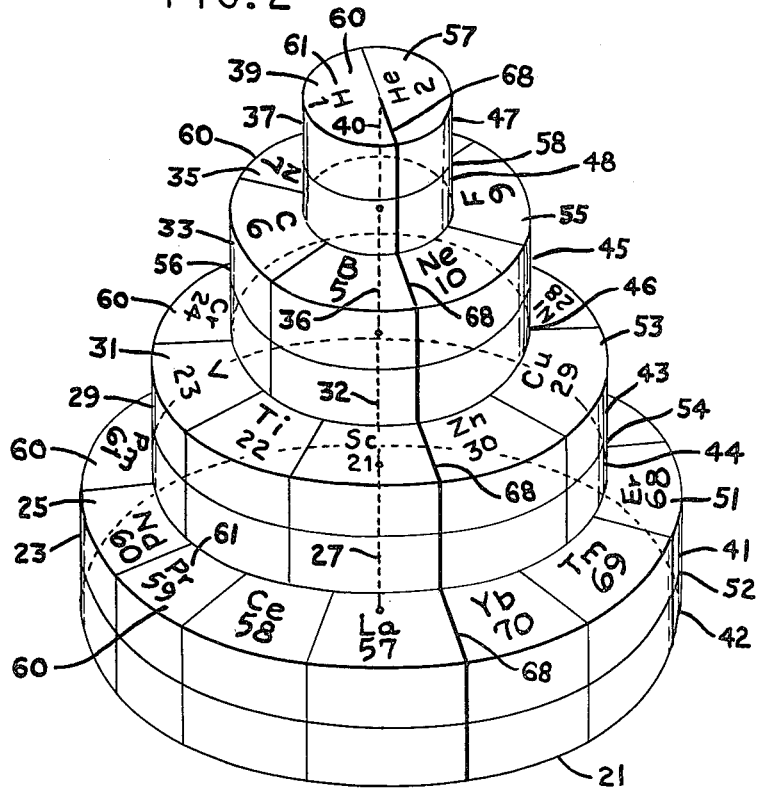
FIG. 2 is a variation of FIG. 1 with the elements grouped into orbitals according to quantum theory.
FIG. 3 is a perspective of the Cylindrical Model, which illustrates one three-dimensional model embodiment of the new periodic table.

FIG. 2 shows a variation of FIG. 1, with the elements grouped into orbitals according to quantum theory. In quantum theory, $n$ = the energy level quantum number or shell number. Each energy level has four orbital subshells, where $l$ = the orbital quantum number. It is common practice to assign letters to the $l$ values as follows:

$$\begin{array}{ccccc} l=0 & l=1 & l=2 & l=3 & l=4. \\ s & p & d & f & g \end{array}$$

Just as the number of electrons that can be put into any main shell is limited to $2n^2$, so the electron population of a subshell is similarly limited. An s subshell or orbital can hold 2 electrons; a p subshell, 6; a d subshell, 10; and an f subshell, 14. FIG. 2 shows each tier section designated from right to left as s, p, d and f. These designations signify the $l$ orbital of the terminal electron subshell of the elements located in that section of the table in the ground state as determined in the science of spectroscopy. The inner first section, or s section, is 2 elements wide; the second, or p section, is 8 elements wide; the third, or d section, is 18 elements wide; and the fourth, of f section, is 32 elements wide. FIG. 2 indicates both the $l$ quantum number under each section number and the appropriate quantum letter number, so that the first section shows $l=0$; the second section, $l=1$; the third section $l=2$; and the fourth section, $l=3$. Finally, the number of electrons in the particular terminal subshell is appropriately indicated in FIG. 2 so that the first section indicates the number of electrons in the terminal subshell as 2; the second section as 6; the third section as 10; and the fourth section as 14.

It is noted that the terminal electrons of four elements that occupy the f orbital grouping of FIG. 2 do not in fact occupy the f orbital. This deviation is shown as Table 1 below, which also indicates the variation on the predicated, or ideal, n value and the real n value.

Table 1

| Element | Atomic Number | n Real | n Ideal | l Real | l Ideal |
|---|---|---|---|---|---|
| Lanthanum | 57 | 5 | 4 | 2 | 3 |
| Gadolinium | 64 | 5 | 4 | 2 | 3 |
| Actinium | 89 | 6 | 5 | 2 | 3 |
| Thorium | 90 | 6 | 5 | 2 | 3 |

FIG. 2 also labels the tier (T) numbers from 1 through 4; the period (P) numbers from 1 through 8. The number of elements ($N_p$) in each period is shown as two 2s, two 8s, two 18s, and two 32s; and the number of elements in a tier ($N_t$) as 4, 16, 36 and 64 to match Tiers 1, 2, 3 and 4.

The quantum numbers n and l can be determined from FIG. 2. These values can be summarized by the following relationship:

$$n + l = P$$

where P is the number of the period in which the element is located.

A three-dimensional Cylinder Model device, shown in perspective in FIG. 3, is generated from FIGS. 1 and 2. Circular configurations are generated for each of the tiers, creating a series of four cylinders, one for each tier. In addition, each cylinder has an upper cylindrical section and a lower cylindrical section, comprising eight cylindrical sections, which in fact are configurations generated from each of the periods shown in FIGS. 1 and 2. These eight cylindrical sections are generated as circular configurations in FIG. 3 for each of the periods, creating a series of eight sections, one for each period. That is, the same model can be generated by rolling each of the tiers of FIG. 2 into four cylinders and arranging the four cylinders into upper and lower cylindrical sections.

This device for displaying the improved periodic table of the chemical elements is shown in FIG. 3 as a Cylinder Model. The Cylinder Model device 21 comprises a first cylinder 23 having an upper surface 25 and a central axis 27; a second cylinder 29 of reduced diameter relative to the first cylinder and having an upper surface 31 and a central axis 32 and being detachably mounted on the upper surface 25; a third cylinder 33 of reduced diameter relative to the second cylinder and having an upper surface 35 and a central axis 36 and being detachably mounted on upper surface 31; and a fourth cylinder 37 of reduced diameter relative to the third cylinder and having an upper surface 39 and a central axis 40 and being detachably mounted on upper surface 35. The second, third, and fourth cylinders are all coaxial with central axis 27 of first cylinder 23. Each of the four cylinders has an upper cylindrical section and a lower cylindrical section as follows: first cylinder 23 is divided into upper cylindrical section 41 and lower cylindrical section 42; second cylinder 29 is divided into upper cylindrical section 43 and lower cylindrical section 44; third cylinder 33 is divided into upper cylindrical section 45 and lower cylindrical section 46; and fourth cylinder 37 is divided into upper cylindrical section 47 and lower cylindrical section 48. Each of the cylindrical sections has an upper surface as follows: upper cylindrical section 41 has an upper surface 51; lower cylindrical section 42 has an upper surface 52; upper cylindrical section 43 has an upper surface 53; lower cylindrical section 44 has an upper surface 54;

upper cylindrical section 45 has an upper surface 55; lower cylindrical section 46 has an upper surface 56; upper cylindrical section 47 has an upper surface 57; and lower cylindrical section 48 has an upper surface 58. Each of the upper cylindrical sections is detachably mounted on the upper surface of the lower cylindrical sections, and each of the lower cylindrical sections is detachably mounted on the upper surfaces of the second, third and fourth cylinders.

FIG. 3 does not illustrate the upper surfaces 52, 54, 56 and 58 of lower cylindrical sections 42, 44, 46 and 48, but only indicates them as lines of separation between the upper and lower cylindrical sections. These upper sections of the lower cylindrical sections can be seen when the upper cylindrical sections are lifted from the lower cylindrical sections in FIGS. 4 through 11. The model can be transparent as an aid in reading the lower indicia, but a detachable model is preferred, and a transparent, detachable model primarily preferred.

Upper surfaces 51, 52, 53, 54, 55, 56, 57 and 58 have marked on them a plurality of discrete spaces, or sectors, containing indicia dehoting the chemical elements. These spaces and indicia are shown in detail in FIGS. 4 through 11, but for purposes of illustration are shown in FIG. 3 as discrete element-sectors 60 and indicia, typified by

H
1, representing the element hydrogen, atomic number 1, designated 61 on upper surfaces 51 and 57.

Figure 4:
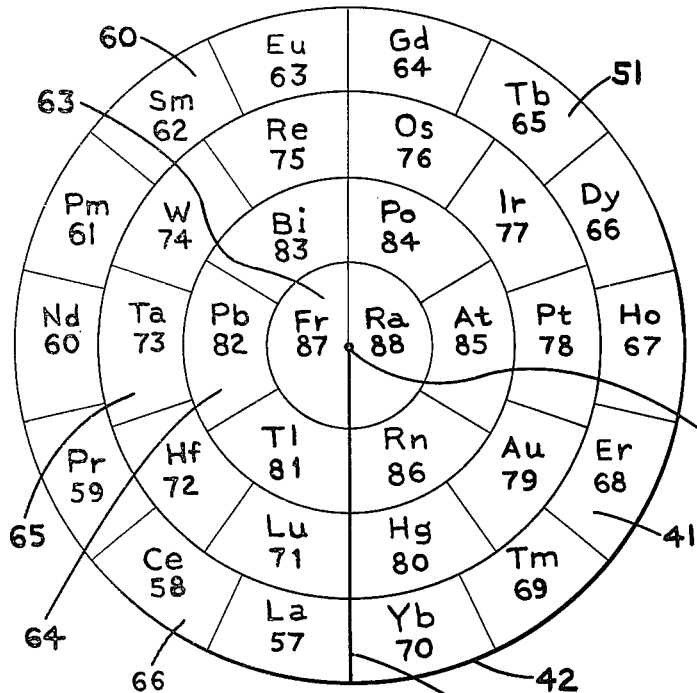
FIG. 4 is a top view of the upper surface of the upper cylindrical section of the first cylinder of the Cylinder Model.
Figure 6:
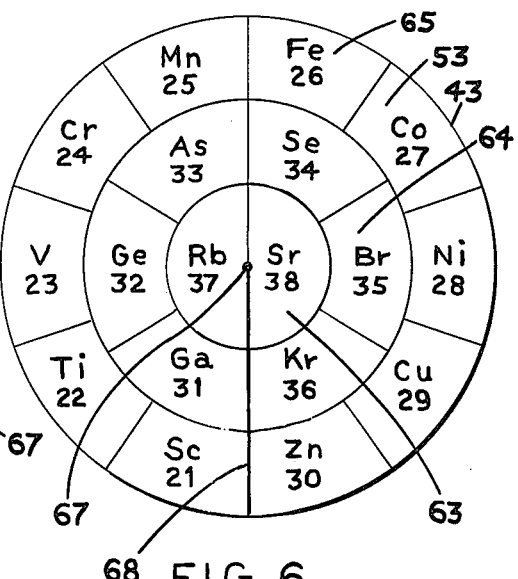
FIG. 6 is a top view of the upper surface of the upper cylindrical section of the second cylinder of the Cylinder Model.
Figure 5:
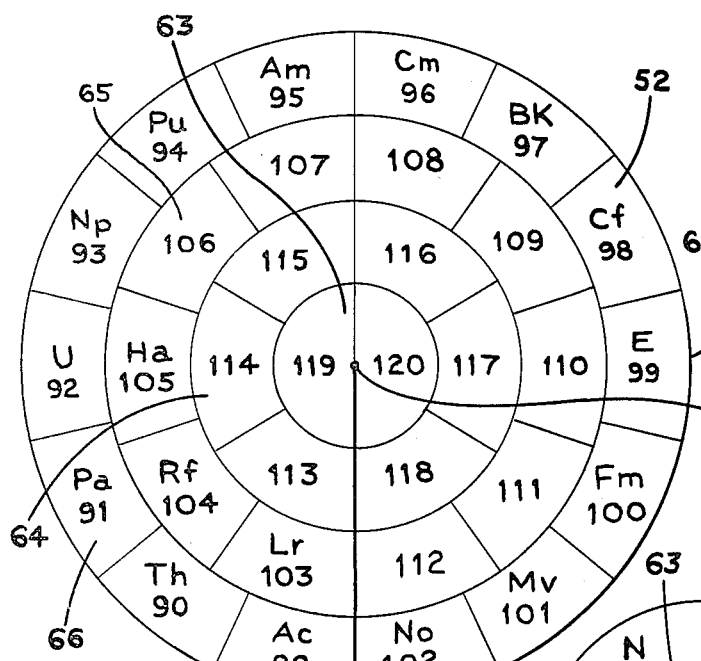
FIG. 5 is a top view of the upper surface of the lower cylindrical section of the first cylinder of the Cylinder Model.
Figure 7:
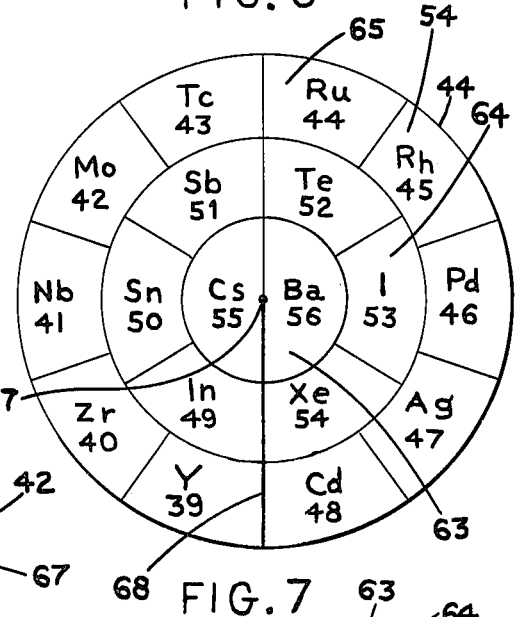
FIG. 7 is a top view of the upper surface of the lower cylindrical section of the second cylinder of the Cylinder Model.
Figures 8, 10, 11:
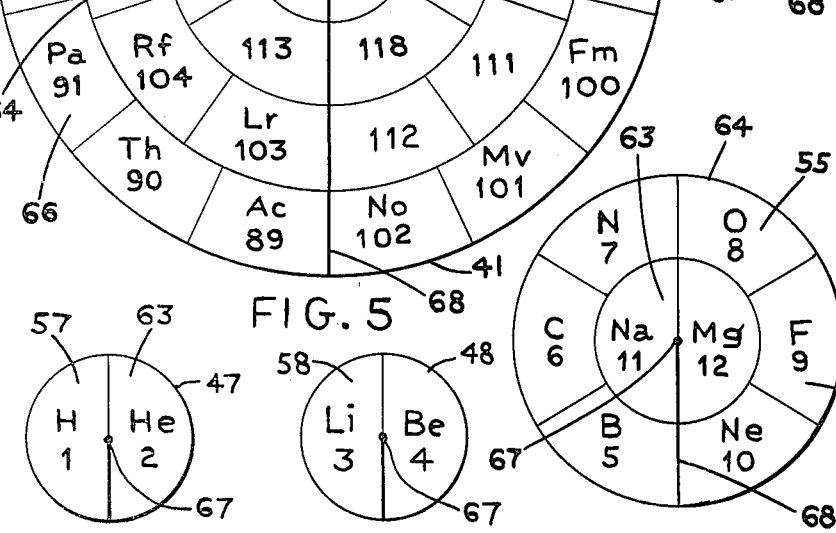
FIG. 8 is a top view of the upper surface of the upper cylindrical section of the third cylinder of the Cylinder Model.
FIG. 10 is a top view of the upper surface of the upper cylindrical section of the fourth cylinder of the Cylinder Model.
FIG. 11 is a top view of the upper surface of the lower cylindrical section of the fourth cylinder of the Cylinder Model.
Figure 9:
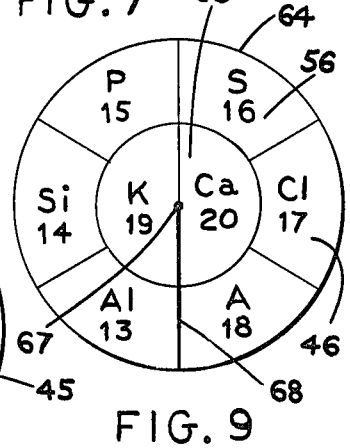
FIG. 9 is a top view of the upper surface of the lower cylindrical section of the third cylinder of the Cylinder Model.

FIGS. 4 through 11 illustrate the surfaces of the eight upper and lower cylindrical sections. FIG. 4 illustrates surface 51 of upper cylindrical section 41; FIG. 5 surface 52 of lower cylindrical section 42; FIG. 6 surface 53 of upper cylindrical section 43; FIG. 7 surface 54 of lower cylindrical section 44; FIG. 8 surface 55 of upper cylindrical section 45; FIG. 9 surface 56 of lower cylindrical section 46; FIG. 10 surface 57 of upper cylindrical section 47; and FIG. 11 surface 58 of lower cylindrical section 48.

Surface 57 of upper cylindrical section 47 and surface 58 of lower cylindrical section 48 of fourth cylinder 37 define central circular area 63. Surface 55 of upper cylindrical section 45 and surface 56 of lower cylindrical section 46 of third cylinder 33 are marked to form central circular area 63 and a first annular section 64. Surface 53 of upper cylindrical section 43 and surface 54 of lower cylindrical section 44 of second cylinder 29 are marked to form central circular area 63, first annular section 64, and a second annular section 65. Surface 51 of upper cylindrical section 41 and surface 52 of lower cylindrical section 42 of first cylinder 23 are marked to form central circular area 63, first annular section 64, second annular section 65, and third annular section 66. First annular section 64 is formed outwardly adjacent to central circular area 63. Second annular section 65 is formed outwardly adjacent to first annular section 64. Third annular section 66 is formed outwardly adjacent to second annular section 65. Preferably, each central circular area 63 has a radius of one unit; each first annular section 64 has an outer radius of two units; each second annular section 65 has an outer radius of three units; and each third annular section 66 has an outer radius of four units.

Central circular areas 63, first annular sections 64, second annular sections 65, and third annular sections 66, have a common center point 67 which is coextensive with the central axis 27 of the first cylinder.

Each of the central circular areas 63 and each of the annular sections 64, 65 and 66 are successively divided into a plurality of discrete spaces, or element sectors, similar to element sector 60 as shown in FIG. 3 and FIG. 4. These element sectors 60 are successively oriented in each of the central circular areas and in each of the annular sections in the same rotational direction. This rotational direction may be either clockwise or counterclockwise; FIGS. 4 through 11 show the direction as clockwise for the purpose of illustration only. Each of the element sectors correspond to one element. Each of the successive element sectors is marked with indicia denoting the chemical elements is ascending order according to the atomic number of the elements, starting from a means for indicating a starting point on each of the surfaces of the upper and lower cylindrical sections through a complete rotation of 360° in each of the circular areas and each of the annular sections.

The elements are illustrated in clockwise rotation in successive element sectors. FIG. 10 illustrates upper surface 57 of upper cylindrical section 47 of fourth cylinder 37, where elements 1 and 2 begin the succession of elements in central circular area 63 from a means for indicating a starting point on each of the upper surfaces of the upper and lower cylindrical sections, which is shown preferably as line 68 marked on each of the upper surfaces from the rim of each of the cylindrical sections, or from the equatorial band of each hemisphere, to the central point or axis of each of the cylindrical sections. Each of the element sectors has contained within it both the symbol of one chemical element along with its proper atomic number.

FIG. 11 illustrates the upper surface 58 of lower cylindrical section 48 of fourth cylinder 37, where elements 3 and 4 continue the succession of elements from line 68 in central circular area 63.

FIG. 8 illustrates upper surface 55 of upper cylindrical section 45 of third cylinder 35 where elements 5 through 10 continue the succession of elements from line 68 in first annular section 64, continuing with elements 11 and 12 from line 68 in central circular area 63.

FIG. 9 illustrates upper surface 56 of lower cylindrical section 46 of third cylinder 33, where elements 13 through 18 continue the succession of elements from line 68 in first annular section 64, continuing with elements 19 and 20 from line 68 in central circular area 63.

FIG. 6 illustrates upper surface 53 of upper cylindrical section 43 of second cylinder 31, where elements 21 through 30 continue the succession of elements from line 68 in second annular section 65, continuing with elements 31 through 36 from line 68 in first annular section 64, and with elements 37 and 38 from line 68 in central circular area 63.

FIG. 7 illustrates upper surface 54 of lower cylindrical section 44 of second cylinder 29, where elements 39 through 48 continue the succession of elements from line 68 in second annular section 65, continuing with elements 49 through 54 from line 68 in first annular section 64, and with elements 55 and 56 from line 68 in central circular area 63.

FIG. 4 illustrates upper surface 51 of upper cylindrical section 41 of first cylinder 23, where elements 57 through 70 continue the succession of elements from line 68 in third annular section 66, continuing with elements 71 through 80 from line 68 in second annular section 65, with elements 81 through 86 from line 68 in first annular section 64, and with elements 87 and 88 from line 68 in central circular area 63.

FIG. 5 illustrates upper surface 52 of lower cylindrical section 42 of first cylinder 23, where elements 89 through 102 continue the succession of elements from line 68 in third annular section 66, continuing with elements 103 through 112 from line 68 in second annular section 65, with elements 113 through 118 from line 68 in first annular section 64, and with elements 119 and 120 from line 68 in central circular area 63. Elements 106 through 120 are imaginary elements.

The s orbital column in FIG. 2 corresponds to central circular areas 63, the p orbital column to first annular sections 64, the d orbital column to second annular sections 65, and the f orbital column to third annular sections 66. It is noted that for any circular area or any annular section, $l = R - 1$, where R is the radius of the circular area or the outer radius of the annular section.

In general, the elements marked in the element sectors occupying each of the central circular areas have their terminal electrons in the s orbital in quantum theory; the elements marked in the element sectors occupying each of the first annular sections have their terminal electrons in the p orbital in quantum theory; the elements marked in the element sectors occupying each of the second annular sections have their terminal electrons in the d orbital in quantum theory; and selected elements indicated in the element sectors occupying each of the third annular sections have their terminal electrons in the f orbital in quantum theory. As noted above in the discussion in relation to FIG. 2, the exceptions to this are lanthanum, gadolinium, actinium, and thorium.

All the element sectors in a given central circular area or annular section subtend the same central angle. In a ring of outer radius R, there are $2(2R-1)$ element sectors, each subtending a sectorial angle $\theta$ such that:

$$\theta = \pi/2R - 1 = \pi/2l + 1$$

So, for example, in the third ring, $l = 2$ and $\theta = \pi/5$.

In its proportions, the concentric cylinders exhibit geometrically Bohr's postulate of the relationship between the number of electrons at a given energy state and the main quantum number of that state. That is, $N_O = 2T^2$, where $N_O$ is the number of electrons at a given energy state. As in the revised two-dimensional table of FIG. 2, this relationship holds between the number of elements in a period and the tier number of that period. Also, the number of elements in each orbital, s, p, d and f follows from a corollary to the Bohr postulate $$2T^2 = \sum_{i=1}^{T} 2(2R_i - 1) = 2 \sum_{i=1}^{T} 2R_i - 1.$$

This relationship states that the populations of the orbitals should follow the series of twice the odd integers, and this is in fact what is observed, both in the concentric cylinder model and in the electron structure of the elements. As a consequence of the geometric relationship between the populations of the circular areas and annular sections and their radii, it is found also that the area occupied by each element sector on the stepped cylinders is the same, that is, $\pi/2$.

Figure 12:
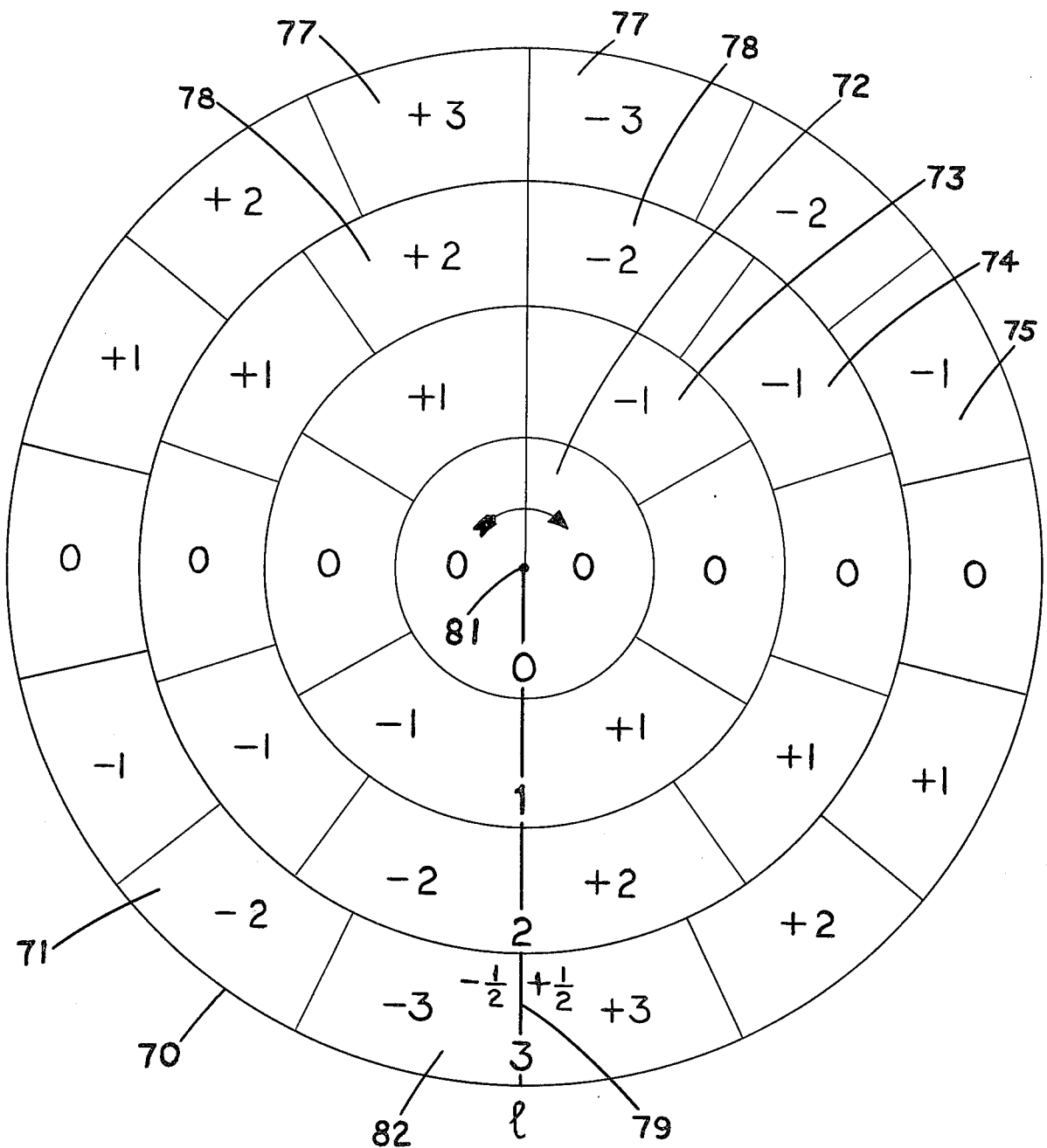
FIG. 12 illustrates a top view of a quantum-number-finder aid.

The quantum numbers $l$, $m_l$, and $m_s$ for the terminal electron of an element can be predicted from the position of the element sector of that element within its period by using the preferably transparent quantum-number-finder aid illustrated in FIG. 12.

Also, the elements indicated on upper cylindrical section 57 of fourth cylinder 37 correspond to period 1 of the new periodic table. The elements indicated on lower cylindrical section 58 of fourth cylinder 37 correspond to period 2 of the new periodic table. The elements on the upper cylindrical section 47 of third cylinder 33 correspond to period 3 of the new periodic table. The elements on the lower cylindrical section 48 of third cylinder 33 correspond to period 4 of the new periodic table. The elements on the upper cylindrical section 44 of second cylinder 29 correspond to period 5 of the new periodic table. The elements on lower cylindrical section 45 of second cylinder 29 correspond to period 6 of the new periodic table. The elements on upper cylindrical section 41 of first cylinder 23 correspond to period 7 of the new periodic table. The elements on lower cylindrical section 42 of first cylinder 23 correspond to period 8 of the new periodic table.

From the above, the n and l numbers of quantum theory can be determined for each of the elements indicated on the cylindrical sections by means of the equation $n + l = P$, where P is the number of the period in which the elements is located. This formula holds true even for the elements lanthanum, gadolinium, actinium, and thorium discussed above.

FIG. 12 illustrates a quantum-number-finder aid preferably circular as shown and preferably with an outer radius of four units, which is used as an aid in conjunction with the Cylinder Model for determining the $m_l$ and $m_s$ numbers of quantum theory. The device comprises preferably transparent member 70 with surface 71 marked to form inner circular area 72, first circular section 73, second circular section 74, and third circular section 75. First circular section 73 is formed outwardly adjacent to inner circular area 72; second circular section 74 is formed outwardly adjacent to first circular section 73; and third circular section 75 is formed outwardly adjacent to second circular area 74.

Inner circular area 72 preferably has a radius of one unit; first circular section 73 an outer radius of two units; second circular section 74 an outer radius of three units; and third circular section 75 an outer radius of four units.

Inner circular area 72, first circular section 73, second circular area 74, and third circular section 75 correspond to central circular area 63, first annular sections 64, second annular sections 65, and third annular sections 66, respectively, of Cylinder Model device 21. Inner circular area 72, first circular section 73, second circular section 74, and third circular section 75 are divided into quantum number sectors 77, which correspond to element sectors 60 marked on the surface of each of the upper and lower cylindrical sections.

Numerals designated as 78 marked on surface 71 of the aid in each quantum number sector 77 represent an $m_l$ number of quantum theory. Numerals 78 start from a means for aligning, shown in FIG. 12, preferably as line 79, which is a line marked on surface 71 of member 70 from the rim of member 70 to central point 81 of the member. The numerals continue from line 79 through a 360° rotation in third circular section 75, second circular section 74, first circular section 73, and inner circular area 72. Each rotation is oriented in the same rotational direction as the indicia marked on the upper surface of the cylindrical sections, beginning with the numeral $-3$ in first quantum number sector 82 in third circular section 75. The numeral −3, because it is to be oriented in the same rotational direction as the remaining numerals 78 and is to begin that orientation, is marked in that quantum number sector that corresponds to the element sector marked with element 89 of third annular section 66 of lower cylindrical section 42 of first cylinder 23. The numerals 78 continue in section 75 rotationally with numerals −2, −1, 0, +1, +2, +3, −3, −2, −1, 0, +1, +2, and +3. The numerals continue in second circular section 74 in the same rotational direction from said means for aligning 79 with numerals −2, −1, 0, +1, +2, −2, −1, 0, +1, and +2. The numerals continue in first circular section 73 in the same rotational direction from said means for aligning 79 with numerals −1, 0, +1, −1, 0 and +1. The numerals terminate with numerals 0 and 0 in said inner circular area 72. The stated numerals represent $m_l$ numbers in quantum theory. When member 70 is in operative position, that is, when means for alignment line 79 is aligned with means for indicating line 68 and quantum number sectors 77 are marked on surface 71 so as to be aligned with element sectors 60 of each of the upper surfaces of the cylndrical sections, the numerals in the quantum number sectors that correspond to elements in selected corresponding element sectors indicate the $m_l$ number of the element in the selected element sectors up to and including element 90.

The correlation between the predicted $m_l$ number and the actual $m_l$ number does not include the thirteen elements listed in Table 2 set forth below. Elements 91 and 92 are also included in the table.

Table 2

| Element | Atomic Number | $m_l$ Expected | $m_l$ Observed |
|---|---|---|---|
| Chromium | 24 | +1 | +2 |
| Copper | 29 | +1 | +2 |
| Niebium | 41 | 0 | +1 |
| Molybdenum | 42 | +1 | +2 |
| Technetium | 43 | +2 | −2 |
| Ruthenium | 44 | −2 | −1 |
| Rhodium | 45 | −1 | 0 |
| Palladium | 46 | 0 | +2 |
| Silver | 47 | +1 | +2 |
| Lanthanum | 57 | −3 | −2 |
| Gadolinium | 64 | −3 | −2 |
| Platinum | 78 | 0 | +1 |
| Gold | 79 | +1 | +2 |
| Protactinium | 91 | −1 | −2 |
| Uranium | 92 | 0 | −1 |

When transparent member 70 is in operative position that is, when means for alignment line 79 is aligned with means for indicating line 68 and quantum number sectors 77 are aligned with the element sectors 60 of each of the upper surfaces of the cylindrical sections, the numeral in the quantum number sector does not correspond with elements 24, 29, 41, 42, 43, 44, 45, 46, 47, 57, 64, 78, and 79 of those elements above element 90.

The numeral $-\frac{1}{2}$, representing one $m_s$ number of quantum theory is marked on one side of means for aligning line 79, and the numeral $+\frac{1}{2}$, representing the other $m_2$ number of quantum theory, is marked on the other side of means for aligning line 79. Each of the $m_2$ numbers apply to each of quantum number sectors 77 for the half circle on each numeral's respective side of means for aligning line 79. The numeral $-\frac{1}{2}$ is oriented to correspond to the element sector marked with element 89 of third annular section 66 of lower cylindrical section 42 of first cylinder 23, so that when member 70 is in the operative position described above, the $m_s$ number that corresponds to the selected element in selected corresponding element sectors on the side of the means for aligning on which the $m_s$ number is marked indicates the $m_s$ number for the selected elements up to and including element 92.

When member 70 is in the operative position described above, that is, when the means for alignment is aligned with the means for indicating and the quantum number sectors are aligned with the element sectors of any of the upper surfaces of the cylindrical sections, the numeral representing the $m_s$ number on the sides of the means for aligning on which elements 43 and 64 are aligned does not represent the $m_s$ number for the elements 43 and 64.

The Table 3 below indicates the elements for which expected $m_s$ values do not conform to observed values.

Table 3

| Element | Atomic Number | $m_s$ Expected | $m_s$ Observed |
|---|---|---|---|
| Technetium | 43 | $-\frac{1}{2}$ | $+\frac{1}{2}$ |
| Gadolinium | 64 | $+\frac{1}{2}$ | $-\frac{1}{2}$ |

Another three-dimensional representation of the new periodic table is also derived from FIGS. 1 and 2 and is a variation of the Cylinder Model. Sphere Model 80 comprises a series of four preferably transparent concentric spheres. FIGS. 13, 14, 15 and 16 illustrate each of these spheres. FIG. 17 is a sectional view of the spheres as assembled concentrically.

Figure 13:
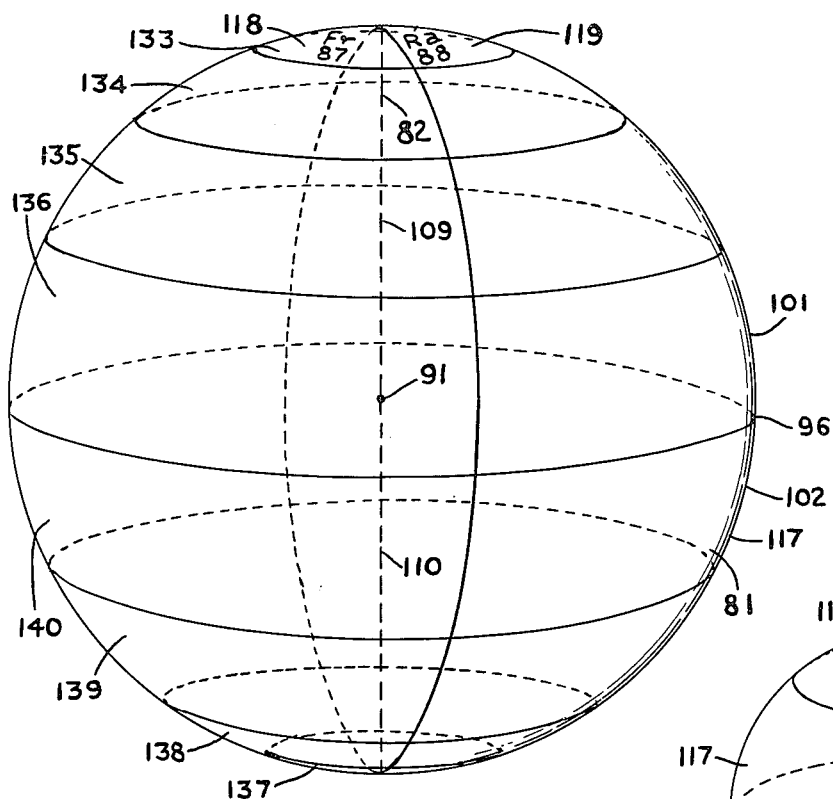
FIG. 13 is a perspective of the first sphere of the Sphere Model.
Figure 15:
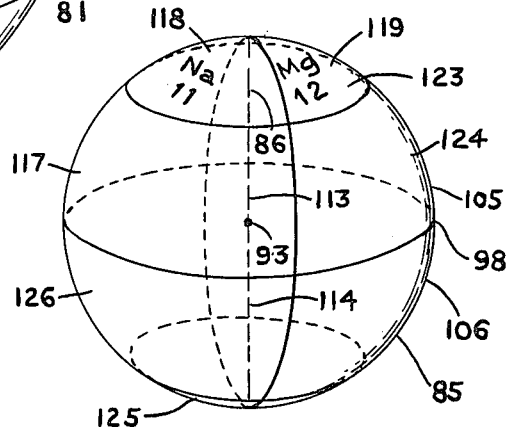
FIG. 15 is a perspective of the third sphere of the Sphere Model.
Figure 14:
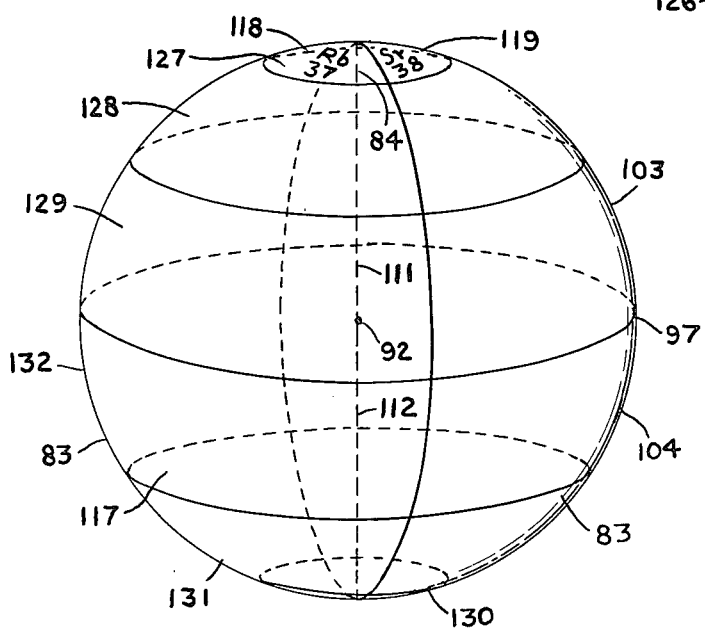
FIG. 14 is a perspective of the second sphere of the Sphere Model.
Figure 16:
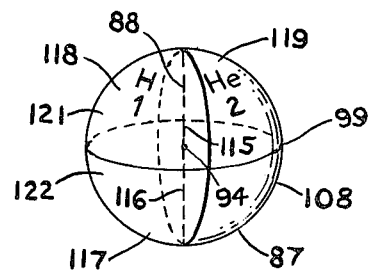
FIG. 16 is a perspective of the fourth sphere of the Sphere Model.
Figure 17:
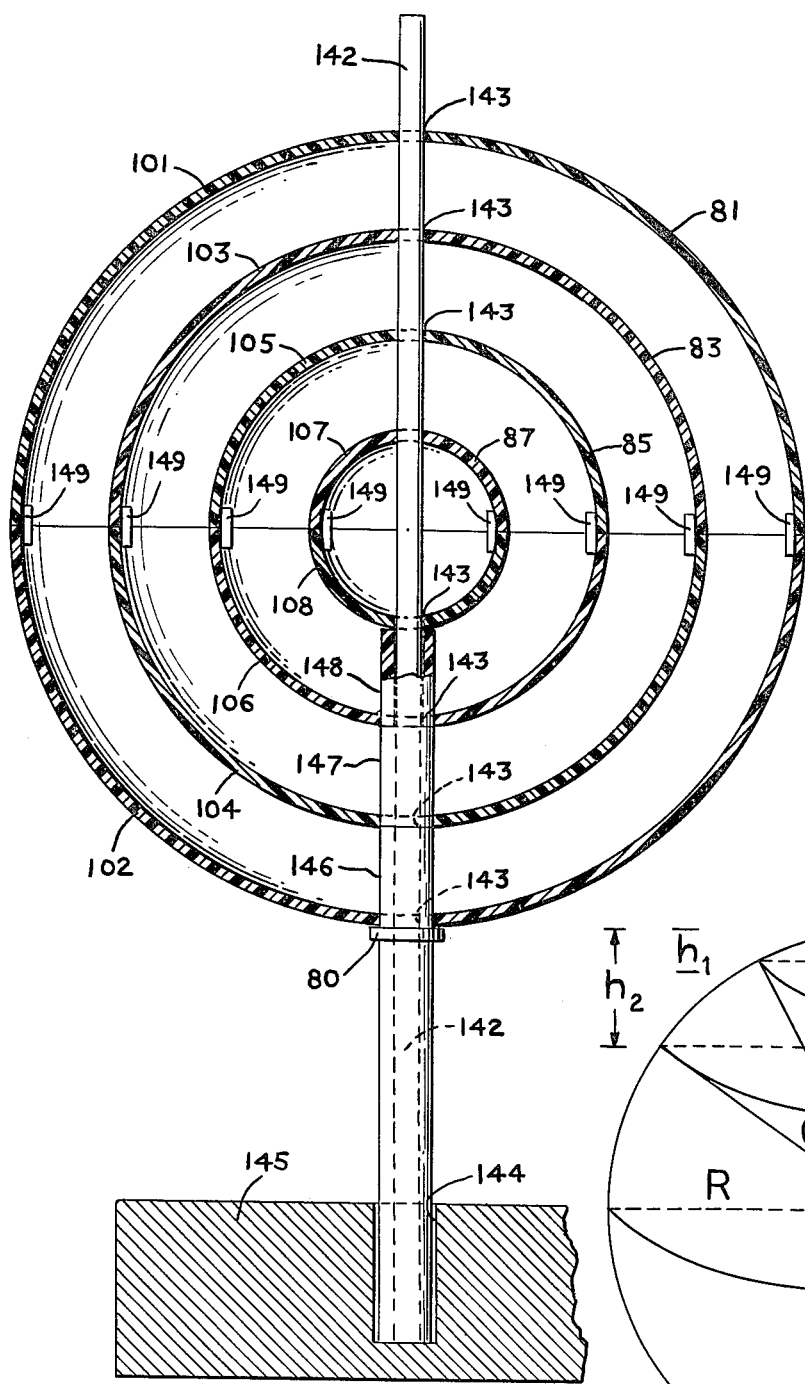
FIG. 17 is a sectional view of the assembled concentric spheres of the Sphere Model.

Sphere Model 80, which is a device for displaying the improved periodic table of the chemical elements, comprises first sphere 81, illustrated in FIG. 13, which has central axis 82; second sphere 83 of reduced diameter relative to first sphere 81 and which has central axis 84 and is mounted within sphere 81, and which is illustrated in FIG. 14; third sphere 85 of reduced diameter relative to second sphere 83 and which has central axis 86 and is mounted within sphere 83, and which is illustrated in FIG. 15; and fourth sphere 87 of reduced diameter relative to third sphere 85 and which has central axis 88 and is mounted within third sphere 85 and which is illustrated in FIG. 16. The four spheres are concentrically mounted as illustrated in FIG. 17.

Each of said spheres has a center point, sphere 81 having center point 91, sphere 83 having center point 92, sphere 85 having center point 93, and sphere 87 having center point 94. The spheres are concentrically mounted so that each center point of each sphere coincides. The spheres are coaxial with the central axis of the first sphere; that is, central axes 84, 86, and 88 are coaxial with central axis 82.

Each sphere is marked by an equatorial band that divides each of the spheres into an upper hemisphere and a lower hemisphere. Sphere 81 is divided into upper hemisphere 101 and lower hemisphere 102 by equatorial band 96; sphere 83 is divided into upper hemisphere 103 and lower hemisphere 104 by equatorial band 97; sphere 85 is divided into upper hemisphere 105 and lower hemisphere 106 by equatorial band 98; and sphere 87 is divided into upper hemisphere 107 and lower hemisphere 108 by equatorial band 99.

Equator is here defined as the great circle of a sphere that is everywhere equally distant from the poles and divides the sphere into upper and lower hemispheres.

Each of the hemispheres has a central axis. Hemisphere 101 has central axis 109; hemisphere 102 has central axis 110; hemisphere 103 has central axis 111; hemisphere 104 has central axis 112; hemisphere 105 has central axis 113; hemisphere 106 has central axis 114; hemisphere 107 has central axis 115; and hemisphere 108 has central axis 116. The axis of each of the hemispheres is coaxial with the axes of the spheres. That is, axes 109, 110, 111, 112, 113, 114, 115, and 116 are coaxial with axes 82, 84, 86, and 88. Each of the upper and lower hemispheres has a surface 117. Each surface 117 of each of the upper and lower hemispheres is marked with a plurality of discrete sectors 118 containing indicia 119 denoting the chemical elements.

Sectors 118 are analagous to element sectors 60 of the Cylinder Model. Sectors 118 and indicia 119 are shown by way of example for the polar areas of each upper hemisphere. As shown by way of example, sectors 118 of hemisphere 101 contain indicia Fr 87 for element 87 and Ra 88 for element 88 in FIG. 13; sectors 118 of hemisphere 103 contain indicia Rb 37 for element 37 and Sr 38 for element 38 in FIG. 14; sectors 118 of hemisphere 105 contain indicia Na 11 for element 11 and Mg 12 for element 12 in FIG. 15; and sectors 118 of hemisphere 107 contain indicia H 1 for element 1 and He 2 for element 2 in FIG. 16. As illustrated, the succession of elements is oriented in a counterclockwise direction, but as discussed below, the direction could also be clockwise.

Each sphere corresponds to a tier of the new periodic table shown in FIGS. 1 and 2. Sphere 87 corresponds to Tier 1; sphere 85 corresponds to Tier 2; sphere 83 corresponds to Tier 3; and sphere 81 corresponds to Tier 4.

The hemispheres correspond to the periods of the new periodic table. Upper hemisphere 107 corresponds to Period 1; lower hemisphere 108 corresponds to Period 2; upper hemisphere 105 corresponds to Period 3; lower hemisphere 106 corresponds to Period 4; upper hemisphere 103 corresponds to Period 5; lower hemisphere 104 corresponds to Period 6; upper hemisphere 101 corresponds to Period 7; lower hemisphere 102 corresponds to Period 8.

From the above, the n and l numbers of quantum theory can be determined for each of the elements marked on the hemisphere by means of the equation $m+l=P$, where P is the number of the period in which the element is located.

The surfaces of the hemispheres are marked to form polar and latitudinal areas. Polar is here defined as relating to the region around a pole of a sphere. Latitude is here defined as an angular distance in either direction from one equator of a sphere measured through 90°.

Upper hemisphere 107 is marked to form polar area 121 and lower hemisphere 108 is marked to form polar area 122. Upper hemisphere 105 is marked to form polar area 123 and first latitudinal segment 124. Lower hemisphere 106 is marked to form polar area 125 and first latitudinal segment 126. Upper hemisphere 103 is marked to form polar area 127, first latitudinal segment 128, and second latitudinal segment 129. Lower hemisphere 104 is marked to form polar area 130, first latitudinal segment 131, and second latitudinal segment 132. Upper hemisphere 101 is marked to form polar area 133, first latitudinal segment 134, second latitudinal segment 135, and third latitudinal segment 136. Lower hemisphere 102 is marked to form polar area 137, first latitudinal segment 138, second latitudinal segment 139, and third latitudinal segment 140.

Each first latitudinal segment is formed outwardly adjacent to each polar area of each hemisphere. Each second latitudinal segment is formed outwardly adjacent to each first latitudinal segment of each hemisphere. Each third latitudinal segment is formed outwardly adjacent to each second latitudinal segment on one side and coextensive with the equatorial band of each hemisphere on the other side.

Each polar area is divided from each first latitudinal segment by an annular line generated on each surface of each hemisphere by a first radius formed from the center point of each sphere at a first angle from the central axis of each sphere. Each first latitudinal segment is divided from each second latitudinal segment by an annular line generated on each of the surfaces of the upper and lower hemispheres by a second radius formed from the center point of each sphere at a second angle from the central axis of each sphere, the second angle being greater than the first angle. Each second latitudinal segment is divided from each third latitudinal segment by an annular line generated on each of the surfaces of the upper and lower hemispheres by a third radius formed from the center point of each sphere at a third angle from the central axis of each sphere, the third angle being greater than the second angle. The radius of sphere 87 is preferably one unit; the radius of sphere 85 is preferably two units; the radius of sphere 83 is preferably three units; and the radius of sphere 81 is preferably four units.

Sectors 118 of the Sphere Model are successively oriented in each of polar areas and in each of the latitudinal segments in the same rotation direction. Each sector 118 corresponds to one element. Sectors 118 are marked with indicia 119 denoting the chemical elements in ascending order according to the atomic number of the elements starting from a means for indicating line 68 on the surfaces of each upper and lower hemisphere, through a complete rotation of 360° in each of the polar areas and each of the latitudinal segments beginning with elements 1 and 2 in polar area 121 of upper hemisphere 107 of fourth sphere 87. The succession continues as follows: Elements 3 and 4 in polar area 122 of lower hemisphere 108 of fourth sphere 87; then continuing to elements 5 through 10 in first latitudinal segment 124 of upper hemisphere 105 of third sphere 85, continuing to elements 11 and 12 in polar area 123 of upper hemisphere 105 of third sphere 85; then continuing to elements 13 through 18 in first latitudinal segment 126 of lower hemisphere 106 of third sphere 85, and continuing to elements 19 and 20 in polar area 125 of lower hemisphere 106 of third sphere 85; then continuing to elements 21 through 30 in second latitudinal segment 129 of upper hemisphere 103 of second sphere 83, continuing to elements 31 through 46 in first latitudinal segment 128 of upper hemisphere 103 of second sphere 83, and continuing to elements 37 and 38 in polar area 127 of upper hemisphere 103 of second sphere 83; then continuing to elements 39 through 48 in second latitudinal segment 132 of lower hemisphere 104 of second sphere 83, continuing to elements 49 through 54 in first latitudinal segment 131 of lower hemisphere 104 of second sphere 83, and continuing to elements 55 and 56 in polar area 130 of lower hemisphere 104 of second sphere 83; then continuing to elements 57 through 70 in third latitudinal segment 136 of upper hemisphere 101 of first sphere 81, continuing to elements 71 through 80 in second latitudinal segment 135 of upper hemisphere 101 of first sphere 81, continuing to elements 81 through 86 in first latitudinal segment 134 of upper hemisphere 101 of first sphere 81, and continuing to elements 87 and 88 in polar area 133 of upper hemisphere 101 of first sphere 81, and then continuing to elements 89 through 102 of third latitudinal segment 140 of lower hemisphere 102 of first sphere 81, continuing to elements 103 through 112 of second latitudinal segment 139 of lower hemisphere 102 of first sphere 81, continuing to elements 113 through 118 of first latitudinal segment 138 of lower hemisphere 102 of first sphere 81, and terminating with elements 119 and 120 in polar area 137 of lower hemisphere 102 of first sphere 81. Elements 106 through 120 are unnamed or imaginary elements.

The succession of elements follow the identical pattern of the elements as shown in FIGS. 4 through 11, with it being understood that the pattern is as follows: FIG. 4 illustrates the pattern for upper hemisphere 107; FIG. 5 illustrates the pattern for lower hemisphere 108; FIG. 6 illustrates the pattern for upper hemisphere 105; FIG. 7 illustrates the pattern for lower hemisphere 106; FIG. 8 illustrates the pattern for upper hemisphere 103; FIG. 9 illustrates the pattern for lower hemisphere 104; FIG. 10 illustrates the pattern for upper hemisphere 101; and FIG. 11 illustrates the pattern for lower hemisphere 102. FIGS. 4 through 11 illustrate a counter-clockwise direction of rotation, but a clockwise rotation is equally acceptable.

In particular, the relationship between the succession of elements in the Sphere Model and the succession of elements as shown in FIGS. 4, 5, 6, 7, 8, 9, 10, and 11 is as follows: The succession of elements of hemisphere 101 corresponds to the succession as shown in FIG. 4: Polar area 133 corresponds to inner circular area 63; first latitudinal segment 134 corresponds to first ring 64; second latitudinal segment 135 corresponds to second ring 65; and third latitudinal segment 136 corresponds to third ring 66. The succession of elements of hemisphere 102 correspond to the succession as shown in FIG. 5: Polar area 137 corresponds to inner circular area 63; first latitudinal segment 138 corresponds to first ring 64; second latitudinal segment 139 corresponds to second ring 65; and third latitudinal segment 140 corresponds to third ring 66. The succession of elements of hemisphere 103 corresponds to the succession as shown in FIG. 6: Polar area 127 corresponds to inner circular area 63; first latitudinal segment 128 corresponds to first ring 64; and a second latitudinal segment 129 corresponds to second ring 65. The succession of elements of hemisphere 104 corresponds to the succession as shown in FIG. 7: Polar area 130 corresponds to inner circular area 63; first latitudinal segment 131 corresponds to first ring 64; and second latitudinal segment 132 corresponds to second ring 65. The succession of elements of hemisphere 105 corresponds to the succession as shown in FIG. 8: Polar area 123 corresponds to inner circular area 63; and first latitudinal segment 124 corresponds to first ring 64. The succession of elements of hemisphere 106 corresponds to the succession as shown in FIG. 9: Polar area 125 corresponds to inner circular area 63; and first latitudinal segment 126 corresponds to first ring 64. The succession of elements of hemisphere 121 corresponds to the succession as shown in FIG. 10: Polar area 121 corresponds to inner circular area 63. The succession of elements of hemisphere 122 corresponds to the succession as shown in FIG. 11: Polar area 122 corresponds to inner circular area 63.

A sectional side view of Sphere Model 80 is shown in FIG. 17. Fourth sphere 87 is surrounded by third sphere 85, which is surrounded by second sphere 83, which is surrounded by first sphere 81. Each sphere surrounds or is surrounded by another sphere concentrically. The Sphere Model can be supported in concentric position by any suitable supporting means. FIG. 17 illustrates one such supporting means by way of example. Support rod 142 passes through upper and lower polar apertures 143 in each sphere and is received by hole 144 in base 145. The spheres are separated from one another and kept in concentric position and vertical alignment by wedges 146, 147 and 148 located between spheres 81, 83, 85, and 87, respectively. The hemispheres of the sphere are demountably assembled so that each sphere can be separated into its upper and lower hemisphere. The hemispheres are kept in horizontal alignment by four lugs 149 attached to each lower hemisphere at 90° intervals around the inner equatorial rim so that each upper hemisphere fits around the lugs and is held in horizontal alignment by them.

The elements marked in the sectors occupying each of the polar areas have their terminal electrons in the s orbital in quantum theory. Elements marked in the element sectors occupying each of the first latitudinal segments have their terminal electrons in the p orbit in quantum theory. The elements marked in the element sectors occupying each of the second latitudinal segments have their terminal electrons in the d orbital in quantum theory. Selected elements marked in the sectors occupying each of the third latitudinal segments have their terminal electrons in the f orbital in quantum theory. From this the L number in quantum theory can be determined.

Elements 57, 64, 89 and 90 marked in the element sectors occupying the third latitudinal segment do not have their terminal electrons in the f orbital in quantum theory. Table 1 above shows details of this deviation.

Each sector in the Sphere Model is equal in area, that is, is equal to $\pi$.

Figure 18:
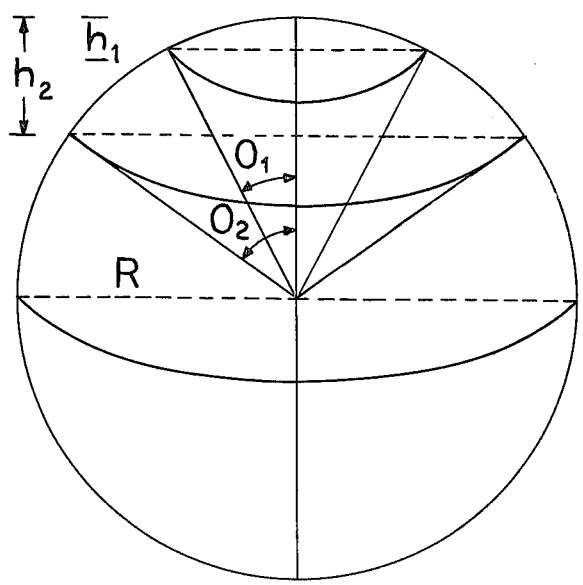
FIG. 18 is a three-dimensional illustration of the method used in calculating the values of the zone angles of the Sphere Model.

In setting up the geometry of the spheres, the first, second, and third angles referred to above are determined by the relationship $$\cos \theta = 1 - A/2\pi R^2$$

wherein $\theta$ is the angle being determined, A is the area of the polar area of latitudinal segment or sum of polar areas, a latitudinal segment relating to the angle such that the area is always the base of a cone whose base is the center of the first, second, third, or fourth spheres, whichever is being determined, and R is the radius of the respective sphere. FIG. 18 illustrates the determination of two $\theta$s, $\theta_1$, and $\theta_2$. Here h is the height of a polar area or latitudinal segment.

Table 4 below gives the angles and heights for the Sphere Model.

Table 4

| Sphere | Polar Area | | First Latitudinal Segment | | Second Latitudinal Segment | | Third Latitudinal Segment | |
|---|---|---|---|---|---|---|---|---|
| | $\theta$ | h/r | $\theta$ | h/r | $\theta$ | h/r | $\theta$ | h/r |
| 1 | 20.4° | 1/16 | 41.4° | 4/16 | 64° | 9/16 | 90° | 1 |
| 2 | 27.3° | 1/9 | 56.3° | 4/9 | 90° | 1 | — | — |
| 3 | 41.4° | 1/4 | 90° | 1 | — | — | — | — |
| 4 | 90° | 1 | — | — | — | — | — | — |

The table also gives the ratio h/r.

I claim:

1. A device for displaying an improved periodic table of the chemical elements, which comprises a first cylinder having an upper surface and a central axis, a second cylinder of reduced diameter relative to said first cylinder and having an upper surface and a central axis and being detachably mounted on said upper surface of said first cylinder, a third cylinder of reduced diameter relative to said second cylinder and having an upper surface and a central axis and being detachably mounted on said upper surface of said second cylinder, a fourth cylinder of reduced diameter relative to said third cylinder and having an upper surface and a central axis and being detachably mounted on said upper surface of said third cylinder, said cylinders all being coaxial with said central axis of said first cylinder, each of said cylinders having an upper cylindrical section and a lower cylindrical section, each of said cylindrical sections having an upper surface, each of said upper cylindrical sections being detachably mounted on said upper surfaces of said lower cylindrical sections, and each of said upper surfaces of said cylindrical sections having a plurality of discrete element sectors containing indicia denoting the chemical elements.

2. The device of claim 1, wherein each of said upper surfaces of said upper and lower cylindrical sections of said fourth cylinder defines a central circular area;

each of said upper surfaces of said upper and lower cylindrical sections of said third cylinder is marked to form a central circular area and a first annular section;

each of said upper surfaces of said upper and lower cylindrical sections of said second cylinder is marked to form a central circular area, a first annular section, and a second annular section;

each of said upper surfaces of said upper and lower cylindrical sections of said first cylinder is marked to form a central circular area, a first annular section, a second annular section, and a third annular section;

said first annular section being formed outwardly adjacent to said central circular area;

said second annular section being formed outwardly adjacent to said first annular section;

said third annular section being formed outwardly adjacent to said second annular section;

each of said central circular areas having a radius of one unit;

each of said first annular sections having an outer radius of two units;

each of said second annular sections having an outer radius of three units; and each of said third annular sections having an outer radius of four units.

3. The device of claim 2, wherein said central circular areas, said first annular sections, said second annular sections, and said third annular sections have a common center point, said center point being coextensive with said central axis of said first cylinder.

4. The device of claim 2, wherein said element sectors are successively oriented in each of said central circular areas and in each of said annular sections in the same rotational direction, each of said sectors corresponding to one element, each of said successive element sectors being marked with said indicia denoting the chemical elements in ascending order according to the atomic number of the elements starting from a means for indicating a starting point on each of said surfaces of said upper and lower cylindrical sections through a complete rotation of 360° in each of said circular areas and each of said annular sections, beginning with elements 1 and 2 in said central circular area of said upper cylindrical section of said fourth cylinder; then continuing to elements 3 and 4 in said central circular area of said lower cylindrical section of said fourth cylinder; then continuing to elements 5 through 10 in said first annular section of said upper cylindrical section of said third cylinder, and continuing to elements 11 and 12 in said central circular area of said upper cylindrical section of said third cylinder; then continuing to elements 13 through 18 in said first annular section of said lower cylindrical section of said third cylinder, and continuing to elements 19 and 20 in said central circular area of said lower cylindrical section of said third cylinder; then continuing to elements 21 through 30 in said second annular section of said upper cylindrical section of said second cylinder, continuing to elements 31 through 46 in said first annular section of said upper cylindrical section of said second cylinder, and continuing to elements 37 and 38 in said central circular area of said upper cylindrical section of said second cylinder; then continuing to elements 39 through 48 in said second annular section of said lower cylindrical section of said second cylinder, continuing to elements 49 through 54 in said first annular section of said lower cylindrical section of said second cylinder, and continuing to elements 55 and 56 in said central circular area of said lower cylindrical section of said second cylinder; then continuing to elements 57 through 70 in said third annular section of said upper cylindrical section of said first cylinder, continuing to elements 71 through 80 in said second annular section of said upper cylindrical section of said first cylinder, continuing to elements 81 through 86 in said first annular section of said upper cylindrical section of said first cylinder, and continuing to elements 87 and 88 in said central circular area of said upper cylindrical section of said first cylinder; and then continuing to elements 89 through 102 of said third annular section of said lower cylindrical section of said first cylinder, continuing to elements 103 through 112 of said second annular section of said lower cylindrical section of said first cylinder, continuing to elements 113 through 118 of said first annular section of said lower cylindrical section of said first cylinder, and terminating with elements 119 and 120 in said central circular area of said lower cylindrical section of said first cylinder; said elements 106 through 120 being unnamed or imaginary elements.

5. The device of claim 4, wherein said means for indicating is a line marked on each of said upper surfaces from the rim of each of said cylindrical sections to said central axis of each of said cylindrical sections.

6. The device of claim 4, wherein elements marked on said element sectors occupying each of said central circular areas have their terminal electrons in the s orbital in quantum theory;

elements marked in the element sectors marked in each of said first annular sections have their terminal electrons in the p orbital in quantum theory; elements marked in said element sectors marked in each of said second annular sections have their terminal electrons in the d orbital in quantum theory; and selected elements marked in said element sectors occupying each of said third annular sections have their terminal electrons in the f orbital in quantum theory;

wherefrom the l number in quantum theory can be determined.

7. The device of claim 6, wherein elements 57, 64, 89 and 90 marked in said element sectors occupying said third annular sections do not have their terminal electrons in the f orbital in quantum theory.

8. The device of claim 4, wherein said elements marked on said upper cylindrical section of said fourth cylinder correspond to period 1 of said improved periodic table; said elements on said lower cylindrical section of said fourth cylinder correspond to period 2 of said periodic table; said elements on said upper cylindrical section of said third cylinder correspond to period 3 of said periodic table; said elements on said lower cylindrical section of said third cylinder correspond to period 4 of said periodic table; said elements on said upper cylindrical section of said second cylinder correspond to period 5 of said periodic table; said elements on said lower cylindrical section of said second cylinder correspond to period 6 of said periodic table; said elements on said upper cylindrical section of said first cylinder correspond to period 7 of said periodic table; said elements on said lower cylindrical section of said first cylinder correspond to period 8 of said periodic table; whereby the n and l numbers of quantum theory can be determined for each of the elements marked on said cylindrical sections by means of the equation $n+l=P$, where P is the number of the period in which the element is located.

9. The device of claim 4, wherein the area occupied by each of said element sectors is $\pi/2$.

10. The device of claim 1, wherein said upper and lower cylindrical sections are transparent.

11. The device described in claim 4, further comprising an aid for determining the $m_l$ and $m_s$ numbers of quantum theory used in conjunction with said device, which comprises a transparent member with an upper surface marked to form an inner circular area, a first circular section, a second circular section, and a third circular section, said first circular section being formed outwardly adjacent to said inner circular area, said second circular section being formed outwardly adjacent to said first circular section, said third circular section being formed outwardly adjacent to said second circular section, said inner circular area having a radius of one unit, said first circular section having an outer radius of two units, said second circular section having an outer radius of three units, said third circular section having an outer radius of four units, said inner circular area, said first circular section, said second circular section, and said third circular section corresponding to said central circular areas, said first annular sections, second annular sections, and third annular sections respectively of said cylindrical sections, wherein said inner circular area, said first circular section, second circular section, and third circular section are divided into quantum number sectors, said quantum number sectors corresponding to said element sectors marked on the surface of each of said upper and lower cylindrical sections, and numerals marked in each quantum number sector represent an $m_l$ number of quantum theory, starting from a means for aligning marked on said upper surface of said transparent member through a 360° rotation in said inner circular area and in each of said circular sections oriented in the same rotational direction as the indicia marked on said upper surfaces of said cylindrical sections, beginning with the numeral $-3$ in the first quantum number sector of said third circular section, wherein $-3$ is marked in that quantum number sector that corresponds to the element sector marked with element 89 of said third annular section of said lower cylinder of said first cylindrical section, continue rotationally with numerals $-2, -1, 0, +1, +2, +3, -3, -2, -1, 0, +1, +2,$ and $+3$; continue in said second circular section in the same rotational direction from said means for aligning with numerals $-2, -1, 0, +1, +2, -2, -1, 0, +1,$ and $+2$; continue in said first circular section in the same rotational direction from said means for aligning with numerals $-1, 0, +1, -1, 0,$ and $+1$; and terminate with numerals 0 and 0 in said inner circular area, said numerals representing $m_l$ numbers in quantum theory, and when said transparent member is in operative position, wherein said means for alignment is aligned with said means for indicating and said quantum number sectors are marked on said surface so as to be aligned with said element sectors of each of said upper surfaces of said cylindrical sections, the numerals in the quantum number sectors that correspond to elements in selected corresponding element sectors indicate the $m_l$ number of the element in said selected element sectors up to and including element 90.

12. The device described in claim 11, wherein when said member is in said operative position, the numeral representing said $m_s$ numbers in the quantum number sector that matches the element sector in which elements 24, 29, 41, 42, 43, 44, 45, 46, 47, 57, 64, 78, and 79 are marked does not represent the $m_s$ number for said elements 24, 29, 41, 42, 43, 44, 45, 46, 47, 57, 64, 78, and 79.

13. The device described in claim 11, wherein the numeral $-\frac{1}{2}$, representing one $m_s$ number of quantum theory, is marked on one side of said means for aligning, and the numeral $+\frac{1}{2}$, representing the other $m_s$ number of quantum theory, is marked on the other side of said means for aligning, each of said $m_s$ numbers applying to each of said quantum number sectors for the half circle on each numeral's respective side of said means for aligning, the numeral $-\frac{1}{2}$ being oriented to correspond to said element sector marked with element 89 of said third annular section of said lower cylindrical section of said first cylinder, so that when said transparent member is in said operative position, the $m_s$ number that corresponds to the element in selected corresponding element sectors on the side on which said $m_s$ number is marked indicates the $m_s$ number for said element up to and including element 92.

14. The device described in claim 11, wherein when said member is in said operative position, the numeral representing said $m_s$ number on the side of said means for aligning on which elements 43 and 64 are aligned does not represent the $m_s$ number for said elements 43 and 64.

15. The device of claim 11, wherein said transparent member is circular with an outer radius of four units.

* * * * *